(12) United States Patent
Hill

(10) Patent No.: US 10,362,007 B2
(45) Date of Patent: Jul. 23, 2019

(54) SYSTEMS AND METHODS FOR USER ACCOUNT RECOVERY

(71) Applicant: Facebook, Inc., Menlo Park, CA (US)

(72) Inventor: Bradley Wheeler Hill, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

(21) Appl. No.: 14/939,939

(22) Filed: Nov. 12, 2015

(65) Prior Publication Data

US 2017/0142080 A1  May 18, 2017

(51) Int. Cl.
    *H04L 29/06*    (2006.01)
    *H04L 9/32*     (2006.01)
    *H04W 12/06*    (2009.01)

(52) U.S. Cl.
    CPC ............. *H04L 63/06* (2013.01); *H04L 9/321* (2013.01); *H04L 63/08* (2013.01); *H04L 63/083* (2013.01); *H04L 63/102* (2013.01); *H04W 12/06* (2013.01)

(58) Field of Classification Search
    CPC ..... H04L 63/083; H04L 63/08; H04L 63/102; H04L 63/06; H04L 9/321; H04W 12/06
    See application file for complete search history.

(56) References Cited

U.S. PATENT DOCUMENTS

| | | | |
|---|---|---|---|
| 8,505,085 B2 * | 8/2013 | Logan | G06F 21/33 726/9 |
| 8,544,072 B1 * | 9/2013 | Masone | H04L 63/0815 726/10 |
| 8,554,681 B1 * | 10/2013 | Wieder | G06F 21/10 705/51 |
| 9,082,119 B2 * | 7/2015 | Ortiz | G06Q 20/3278 |
| 2004/0019571 A1 * | 1/2004 | Hurwitz | G06Q 20/06 705/65 |
| 2005/0152542 A1 * | 7/2005 | Zheng | H04L 9/0833 380/30 |
| 2010/0250955 A1 * | 9/2010 | Trevithick | G06F 21/31 713/185 |

(Continued)

OTHER PUBLICATIONS

R. Sanchez, F. Almenares, P. Arias, D. Diaz-Sanchez and A. Marin, "Enhancing privacy and dynamic federation in IdM for consumer cloud computing," in IEEE Transactions on Consumer Electronics, vol. 58, No. 1, pp. 95-103, Feb. 2012. (Year: 2012).*

(Continued)

*Primary Examiner* — Kari L Schmidt
(74) *Attorney, Agent, or Firm* — Sheppard Mullin Richter & Hampton LLP

(57) ABSTRACT

Systems, methods, and non-transitory computer-readable media can determine a user request to recover control of an account for accessing an account provider system. A recovery token that is associated with the account can be obtained. A signature for at least a portion of the recovery token can be generated. Metadata information associated with the account provider system can be obtained. The signed recovery token can be provided to the account provider system based at least in part on the metadata information, wherein the account provider system is configured to provide control of the account to the user upon validating the signed recovery token.

20 Claims, 8 Drawing Sheets

(56) References Cited

U.S. PATENT DOCUMENTS

| | | | | |
|---|---|---|---|---|
| 2010/0275009 A1* | 10/2010 | Canard | | H04L 63/0421 713/155 |
| 2011/0067086 A1* | 3/2011 | Nachenberg | | G06F 21/33 726/2 |
| 2011/0078779 A1* | 3/2011 | Liu | | G06F 21/31 726/9 |
| 2011/0154023 A1* | 6/2011 | Smith | | G06F 21/78 713/155 |
| 2012/0260322 A1* | 10/2012 | Logan | | G06F 21/33 726/6 |
| 2013/0031057 A1* | 1/2013 | Vakili | | G06F 11/1458 707/640 |
| 2013/0104202 A1* | 4/2013 | Yin | | G06F 21/42 726/5 |
| 2013/0145148 A1* | 6/2013 | Shablygin | | H04L 63/0853 713/155 |
| 2013/0283362 A1* | 10/2013 | Kress | | G06F 21/44 726/7 |
| 2013/0305054 A1* | 11/2013 | Burchett | | H04L 9/3213 713/185 |
| 2014/0020073 A1* | 1/2014 | Ronda | | G06F 21/31 726/7 |
| 2014/0053251 A1* | 2/2014 | Chen | | H04L 63/08 726/6 |
| 2014/0250511 A1* | 9/2014 | Kendall | | H04L 63/0815 726/6 |
| 2014/0273963 A1* | 9/2014 | Su | | H04W 12/06 455/411 |
| 2014/0282969 A1* | 9/2014 | Ye | | G06F 21/45 726/7 |
| 2015/0227749 A1* | 8/2015 | Schincariol | | H04L 67/1097 726/28 |
| 2015/0327072 A1* | 11/2015 | Powell | | H04L 67/04 455/411 |
| 2015/0372814 A1* | 12/2015 | Ali | | H04L 9/0894 713/155 |
| 2016/0149886 A1* | 5/2016 | Korokithakis | | G06F 21/45 726/6 |
| 2017/0076288 A1* | 3/2017 | Awasthi | | G06Q 20/405 |
| 2019/0020646 A1* | 1/2019 | Magyar | | H04L 63/0815 |

OTHER PUBLICATIONS

Czeskis, Alexei, et al. "Strengthening user authentication through opportunistic cryptographic identity assertions." Proceedings of the 2012 ACM conference on Computer and communications security. (pp. 404-414). ACM, 2012. (Year: 2012).*

* cited by examiner

US 10,362,007 B2

SYSTEMS AND METHODS FOR USER ACCOUNT RECOVERY

FIELD OF THE INVENTION

The present technology relates to the field of user account recovery. More particularly, the present technology relates to techniques for enabling users to regain access to their accounts.

BACKGROUND

Today, people often utilize computing devices (or systems) for a wide variety of purposes. Users can operate their computing devices to, for example, interact with one another, create content, share content, and access information. In some instances, users can perform various actions through an account provided by a computing platform. For example, a user can log into an email account through an email provider service to send and/or receive emails. In another example, a user can log into a social networking account to access the various features provided by the social networking system. Typically, logging into a service requires the user to provide login credentials (e.g., username and password). In some instances, a user's account may need to be recovered, for example, if the user forgets their login credentials or if such login credentials are modified by a third party, for example.

SUMMARY

Various embodiments of the present disclosure can include systems, methods, and non-transitory computer readable media configured to determine a user request to recover control of an account for accessing an account provider system. A recovery token that is associated with the account can be obtained. A signature for at least a portion of the recovery token can be generated. Metadata information associated with the account provider system can be obtained. The signed recovery token can be provided to the account provider system based at least in part on the metadata information, wherein the account provider system is configured to provide control of the account to the user upon validating the signed recovery token.

In an embodiment, systems, methods, and non-transitory computer readable media can be configured to obtain a set of credentials from the user, the set of credentials being associated with an account provided by the system and authenticate the user based at least in part on the set of credentials.

In an embodiment, the user request is initiated through the account provider system.

In an embodiment, the user request is initiated through the recovery provider system.

In an embodiment, the recovery token was previously provided to the system by the account provider system.

In an embodiment, systems, methods, and non-transitory computer readable media can be configured to validate the recovery token using a public key associated with the account provider system.

In an embodiment, systems, methods, and non-transitory computer readable media can be configured to redirect a user agent running on a computing device of the user to the account provider system, wherein the user agent delivers the signed recovery token to the account provider system.

In an embodiment, the user agent is redirected to a Uniform Resource Locator (URL) included in the metadata information, wherein the account provider computing system is configured to receive the signed recovery token through the URL.

In an embodiment, the account provider system is able to validate the signature using a public key obtained from the recovery provider system.

In an embodiment, wherein, upon the signed recovery token being validated, the user is able to create a new set of credentials for the account.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
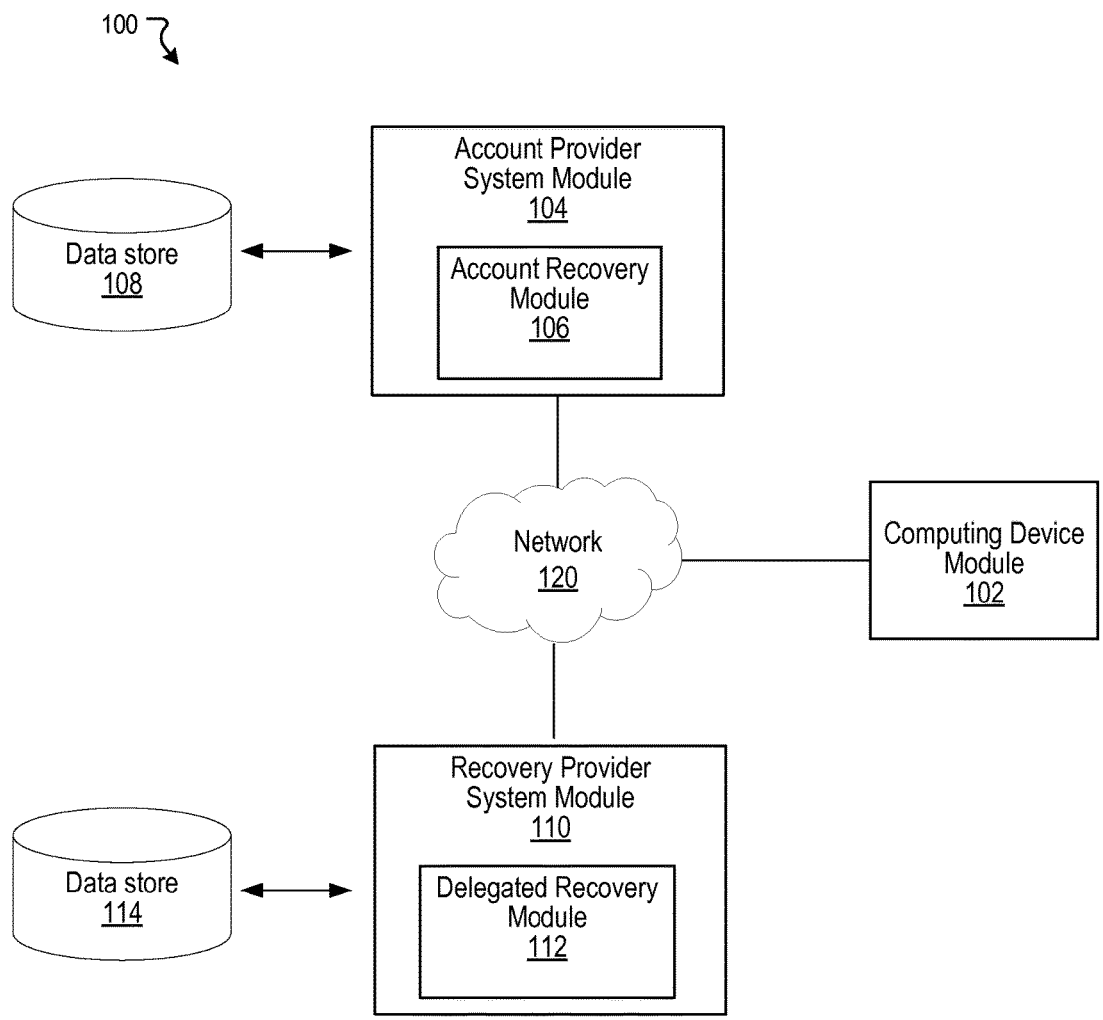
FIG. 1 illustrates an example system including an example system for delegating access recovery of a user account to a recovery provider, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for User Account Recovery

As mentioned, people often utilize computing devices (or systems) for a wide variety of purposes. Users can operate their computing devices to, for example, interact with one another, create content, share content, and access information. In some instances, users can perform various actions through an account provided by a computing platform. For example, a user can log into an email account through an email provider service to send and/or receive emails. In another example, a user can log into a social networking account to access the various features provided by the social networking system. Typically, logging into a service requires the user to provide login credentials (e.g., username and password). In some instances, a user's account may need to be recovered, for example, if the user forgets their login credentials or if such login credentials are modified by a third party, for example.

Conventional approaches for recovering user account access may not be ideal for a number reasons. For example, one approach is to ask the user one or more recovery questions to which the user provided answers. However, choosing recovery questions that are both secure and memorable can be difficult and common choices of subject matter may not be applicable across cultural contexts, age ranges, or other differentiating characteristics of large and diverse audiences. Another approach is to use e-mail password recovery to reset a user's password, for example. However, e-mail does not necessarily provide guarantees of deliverability or end-to-end transport security and, therefore, an adversary performing pervasive surveillance may likely be able to abuse such weaknesses. In another example, federated systems for authentication may appear to solve the problem of account recovery (or at least delegate it implicitly to the Identity Provider). However, few mainstream services are willing to rely exclusively on federated logins for a variety of reasons. For example, a service may view providers of federated login services as competitors or potential competitors, and not wish to disclose information about how often users are logging on, who their most active users are or not desire to show a competitor's logo as part of their login process. Accordingly, such conventional approaches can be inconvenient to users and may not be effective in addressing these and other problems arising in computer technology.

An improved approach rooted in computer technology overcomes the foregoing and other disadvantages associated with conventional approaches specifically arising in the realm of computer technology. In various embodiments, a recovery provider system may be utilized for recovering access to a user account that is provided by an account provider system. For example, a user of the account provider system may forget login credentials associated with the user account. In another example, the user's login credentials may be modified as a consequence of the user's account being hacked. As a result, the user is typically unable to login to the account provider system using the user account. In such instances, the user can initiate recovery of the user account through the recovery provider system. In various embodiments, recovery of the user account can involve resetting the login credentials associated with the user account and allowing the user to create new login credentials. In some embodiments, when recovery of the user account associated with the account provider system is initiated, the user can login to a user account associated with the recovery provider system to confirm the user's identity. The recovery provider can interact with the account provider system to exchange various information (e.g., a recovery token) that is needed to recover the user's account. Once recovery is complete, the user can be permitted to create a new set of login credentials to be used for the user account associated with the account provider system. Various approaches to initiating and recovering the user account are possible as described herein.

FIG. 1 illustrates an example system including an example system 100 for delegating access recovery of a user account to a recovery provider, according to an embodiment of the present disclosure. As shown in the example of FIG. 1, the example system 100 includes an account provider system module 104 that is configured to provide various services that can be accessed by users, for example, over a network 120 (e.g., the Internet). For example, a user operating the computing device module 102 can access the services provided by the account provider system module 104 by logging into the account provider system using a user account. A set of credentials (e.g., user name and password) associated with the user account can be used to login to the user account. The example system 100 also includes a recovery provider system module 110. In some embodiments, the recovery provider system module 110 may be delegated, at least in part, the task of restoring control of a user account that is provided to the user by the account provider system module 104. In such embodiments, the user can operate the computing device module 102 to interact with the recovery provider system module 110 for purposes of initiating various recovery processes to regain control of the user's account. In some instances, the account provider system module 104 can include at least one data store 108. Similarly, the recovery provider system module 110 can also include at least one data store 114. The components (e.g., modules, elements, etc.) shown in this figure and all figures herein are exemplary only, and other implementations may include additional, fewer, integrated, or different components. Some components may not be shown so as not to obscure relevant details.

In some embodiments, the computing device module 102, the account provider system module 104, and the recovery provider system module 110 can each be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the computing device module 102, the account provider system module 104, and the recovery provider system module 110 can each be implemented, in part or in whole, as software running on one or more computing devices or systems, such as on a user computing device or client computing system. For example, the computing device module 102 may be implemented as an application (e.g., app), a program, an applet, in a web browser, etc., running on a user computing device or a client computing system, such as the user device 710 of FIG. 7. Further, the account provider system module 104 and/or the recovery provider system module 110, or at least a respective portion thereof, can be implemented using one or more computing devices or systems that include one or more servers, such as network servers or cloud servers. In some instances, the account provider system module 104 and/or the recovery provider system module 110 can, in part or in whole, be implemented within or configured to operate in conjunction with a social networking system (or service), such as the social networking system 730 of FIG. 7. It should be understood that there can be many variations or other possibilities.

In some embodiments, the account provider system module 104 can be configured to communicate and/or operate with the at least one data store 108 in the example system 100. The at least one data store 108 can be configured to store and maintain various types of data. In various embodiments, the at least one data store 108 can store data relevant to function and operation of the account provider system module 104, such as credentials (e.g., username and password) for various user accounts registered through the account provider system module 104. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities. In some embodiments, the recovery provider system module 110 can be configured to communicate and/or operate with the at least one data store 114 in the example system 100. The at least one data store 114 can be configured to store and maintain various types of data. In various embodiments, the at least one data store 108 can store data relevant to function and operation of the recovery provider system module 110, such as recovery tokens for recovering access to various user accounts registered through the account provider system module 104.

In various embodiments, the account provider system module 104 can include an account recovery module 106 and the recovery provider system module 110 can include a delegated recovery module 112. The account recovery module 106 and the delegated recovery module 112 can be configured to communicate with one another to recover access to a user's account. Such recovery may be needed if the user forgets login credentials associated with the account or if the credentials are modified without the user's authorization. In various embodiments, the user account may be provided by the account provider system module 104 and the recovery provider system module 110 may be delegated the task of performing operations to allow the user to recover access to the user's account. More details regarding the account recovery module 106 and the delegated recovery module 112 will be provided below in reference to FIGS. 2 and 3, respectively.

Figure 2:
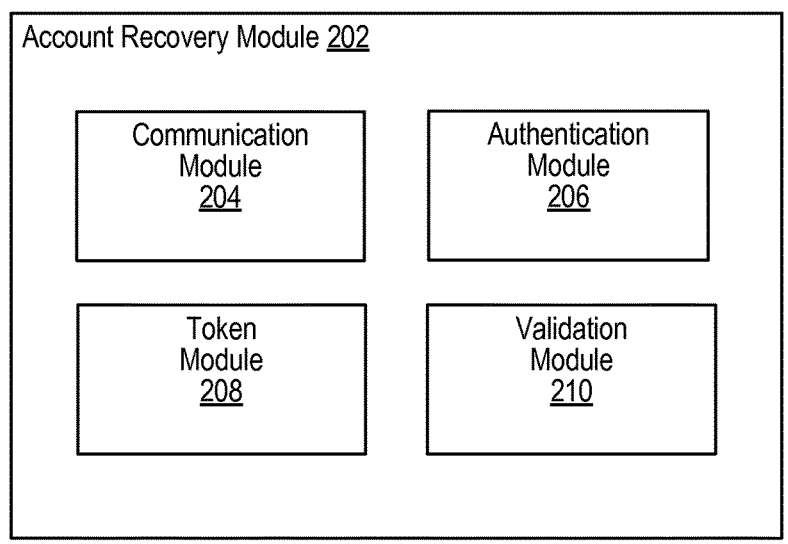
FIG. 2 illustrates an example of an account recovery module configured to facilitate access recovery of user accounts, according to an embodiment of the present disclosure.

FIG. 2 illustrates an example of an account recovery module 202 configured to facilitate access recovery of user accounts, according to an embodiment of the present disclosure. In some embodiments, the account recovery module 106 of FIG. 1 can be implemented with the account recovery module 202. As shown in the example of FIG. 2, the account recovery module 202 can include a communication module 204, an authentication module 206, a token module 208, and a validation module 210.

As mentioned, the account recovery module 202 may be implemented in an account provider system that provides various services that are accessible to users. A user can access the services provided by the account provider system, for example, by creating a user account using a set of credentials. The set of credentials associated with the user account can include, for example, a user name and password that can be used to login to the user account. In various embodiments, the account recovery module 202 can utilize the Transport Layer Security (TLS) cryptographic protocols to perform at least some of the various operations described herein, including for communicating data with other computing devices and systems.

The communication module 204 can be configured to communicate with computing devices being operated by users, for example, to authenticate users and/or initiate recovery of user accounts. In some embodiments, the communication module 204 can be configured to communicate with a third-party recovery system, for example, for purposes of recovering control of a user account. In some embodiments, a user can utilize the account recovery module 202 to delegate the third-party recovery system to be used for recovering control of the user's account that is provided by the account provider system. In such embodiments, the communication module 204 can be configured to determine whether the requested third-party recovery system supports the features needed to recover the user's account and, if so, obtain from the third-party system various metadata information needed for facilitating the recovery process. Such metadata information can include, for example, communication protocols supported by the third-party system, public keys associated with the third-party system, tokens supported by the third-party system (e.g., supported token types and sizes), any Uniform Resource Locators (URLs) to be used for communicating data (e.g., Application Programming Interface, or API, endpoints) that are supported by the third-party recovery system. In some embodiments, the communication module 204 obtains such metadata information by performing a WebFinger request.

The authentication module 206 can be configured to authenticate users that are seeking to access services provided by the account provider system. For example, the account provider system may be an e-mail provider or a social networking system (or service), such as the social networking system 730 of FIG. 7. As mentioned, each user account provided by the account provider system may be associated with a set of credentials (e.g., user name and password). When authenticating a user, the authentication module 206 can determine whether a set of credentials provided by a user satisfy a set of credentials associated with a user account provided by the account provider system.

The token module 208 can be configured to generate a recovery token for a user and a delegated third-party recovery system. The token can be signed using a private key using any of the generally known approaches. For example, in various embodiments, the signature may be performed using the Elliptic Curve Digital Signature Algorithm. This recovery token can be sent to the third-party recover system to be used when recovery of the user's account is initiated. In some embodiments, a user agent (e.g., web browser or app) running on the computing device of the user is instructed to deliver the recovery token to the third-party recovery system. For example, the user agent can utilize a URL, or endpoint, included in the metadata information provided by the third-party recovery system to provide the third-party recovery system with the recovery token. Communication using such URLs, or endpoints, (e.g., "https://social.example.com") can be done in a number of ways including, for example, using the HTTP "POST" method that has been formatted as "application/x-www-form-urlencoded." Upon receiving the recovery token, the third-party recovery system can also authenticate the user, for example, using a set of credentials provided by the user, as described above. In some embodiments, once the recovery token is provided to the third-party recovery system, the user agent can be redirected to a callback URL indicated in the metadata information along with a status code indicating whether the third-party recovery system has been successfully authorized to perform the user account recovery process when needed. In various embodiments, the token may have an internal structure that indicates a protocol version, a type (e.g., a recovery token can be a type "00"), a token identifier, an issuer field indicating the account provider, an audience field indicating the recovery provider, and a data field for storing various additional data corresponding to the token.

The validation module 210 can be configured to validate information for recovering control of a user's account. For example, in some embodiments, when recovery of a user's account is initiated, the third-party recovery system can provide a counter-signed copy of the recovery token associated with the user's account along with other counter-signed information associated with the user's account. The counter-signature may be performed by the third-party recovery system using a private key, for example. The validation module 210 can obtain the public key published by the third-party recovery system to validate the counter-signed recovery token and any other counter-signed information associated with the user's account. In some embodiments, the recovery token can include additional counter-signed information, such as a first field (e.g., "issuer" field) that indicates an identifier for the third-party recovery system and a second field ("original issuer time") field indicating when the third-party recovery system validated and saved the recovery token for the user account. In such embodiments, when validating the counter-signed recovery token, the validation module 210 can compare the time identified in the "original issuer time" field with any issuance time saved in an opaque portion of the original recovery token. If difference between the two times differs by a threshold amount (e.g., 12 hours, 24 hours, etc.), then the validation module 210 can determine that the token is invalid or perform additional verification processing depending on the implementation. In some embodiments, the recovery token can include additional counter-signed information, such as an internal user identifier. In some embodiments, the validation module 210 can compare this internal user identifier to an account identifier provided by the user when initiating recovery of the user account. If the two identifiers do not match, then the validation module 210 may determine that the token is invalid and end the recovery process. Once the token is validated, the validation module 210 restores control of the account to the user and, in some embodiments, allows a new primary authentication method or credential to be established.

Figure 3:
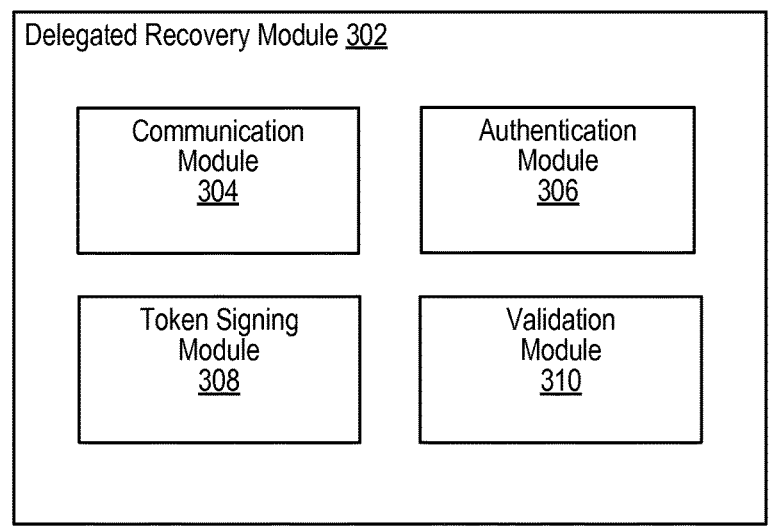
FIG. 3 illustrates an example of a delegated recovery module configured to provide access recovery of user accounts, according to an embodiment of the present disclosure.

FIG. 3 illustrates an example of a delegated recovery module 302 configured to provide access recovery of user accounts, according to an embodiment of the present disclosure. In some embodiments, the delegated recovery module 112 of FIG. 1 can be implemented with the delegated recovery module 302. As shown in the example of FIG. 3, the delegated recovery module 302 can include a communication module 304, an authentication module 306, a token signing module 308, and a validation module 310. The delegated recovery module 302 may be implemented in a third-party recovery system as described above. In various embodiments, the delegated recovery module 302 can utilize the Transport Layer Security (TLS) cryptographic protocols to perform at least some of the various operations described herein, including communicating data with other computing devices and systems.

The communication module 304 can be configured to communicate with computing devices being operated by users, for example, to authenticate users when performing recovery of user accounts. In some embodiments, the communication module 304 can be configured to communicate with an account provider system, for example, for purposes of recovering control of a user account. In some embodiments, the communication module 304 can be configured to obtain various metadata information for facilitating the recovery process from the account provider system. Such metadata information can include, for example, communication protocols supported by the account provider system, public keys associated with the account provider system, and any Uniform Resource Locators (URLs) to be used for communicating data (e.g., Application Programming Interface, or API, endpoints) that are supported by the account provider system. In some embodiments, the communication module 304 obtains such metadata information by performing a WebFinger request.

The authentication module 306 can be configured to authenticate users seeking to recover control of their accounts provided by the account provider system. Each user may have a separate set of credentials associated with respective accounts provided by the delegated recovery module 302.

The token signing module 308 can be configured to counter-sign recovery tokens and other information associated with user accounts. In various embodiments, when recovery is initiated of a user account that is associated with an account provider system, the token signing module 308 can counter-sign a recovery token associated with the user account along with other information associated with the user's account. The signature may be performed using any of the generally known approaches. For example, in various embodiments, the signature may be performed using the Elliptic Curve Digital Signature Algorithm. The counter-signature may be performed by the token signing module 308 using a public key, for example, that was obtained from the account provider system. In some embodiments, the public key is obtained by the communication module 304 using a WebFinger request.

The validation module 310 can be configured to validate information for recovering control of a user's account associated with an account provider system. For example, in some embodiments, when delegating the recovery of a user's account to the delegated recovery module 302, a recovery token associated with the user account may be provided to the validation module 310. In such embodiments, the validation module 310 can obtain a public key associated with the account provider system. In some embodiments, the public key is obtained by the communication module 304 using a WebFinger request. The validation module 310 can utilize the public key to validate a signature in the recovery token and, once validated, the validation module 310 can save the recovery token in a data store (e.g., the data store 114) for recovering the user account in the future.

Figure 4:
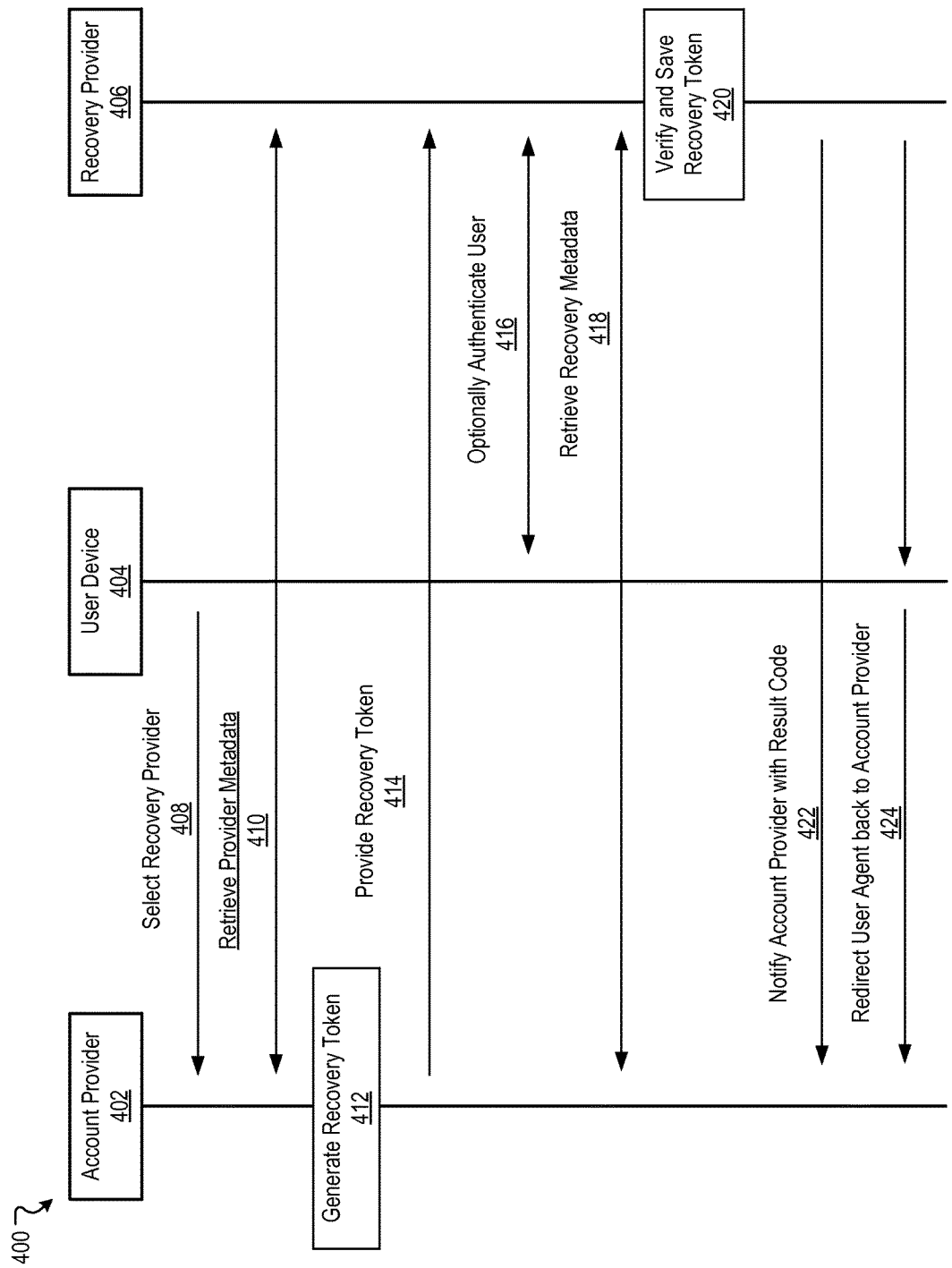
FIG. 4 illustrates an example of a diagram showing the delegating of access recovery for a user account to a recovery provider, according to an embodiment of the present disclosure.

FIG. 4 illustrates an example of a diagram 400 showing the delegating of access recovery for a user account to a recovery provider, according to an embodiment of the present disclosure. The example diagram 400 illustrates interactions between an account provider 402, a user device 404, and a recovery provider 406. It should be appreciated that there can be additional, fewer, or alternative steps performed in similar or alternative orders, or in parallel, within the scope of the various embodiments discussed herein unless otherwise stated.

In the example of FIG. 4, a user has a user account that is provided by the account provider 402. In this example, the user is operating the user device 404 to interact with the account provider 402 to delegate the recovery provider 406 with the authorization needed to facilitate recovery of the user's account (408). Naturally, more than one recovery provider may be delegated by the user depending on the implementation. The account provider 402 can obtain metadata information from the recovery provider 406 to determine whether the recovery provider 406 supports the functionality needed to perform such account recovery (410). The account provider 402 can generate a recovery token to be associated with the user's account (412). The recovery token can be signed and provided to the recovery provider 406 (414). In some embodiments, a user agent (e.g., web browser or app) running on the user device 404 is instructed to deliver the recovery token to the recovery system 406. Once the recovery token is received, the recovery provider 406 can authenticate the user, for example, using a set of credentials associated with the user and the recovery provider 406 (416). In some instances, if the user is already logged into the recovery provider 406, such authentication is not needed. The recovery provider 406 can obtain metadata information from the account provider 402 (418). For example, in some embodiments, the recovery provider 406 can obtain a public key associated with the account provider 402 and any URLs (e.g., API endpoints) to be used for communicating with the account provider 402. Next, the recovery provider 406 can utilize the public key to validate a signature associated with the recovery token to confirm that the signature corresponds to the account provider 402 (420). The recovery provider 406 can save the validated recovery token for use in future recovery of the user's account. The recovery provider 406 can then provide the account provider 402 with a status indicating whether the recovery provider 406 is now acting as a delegated recovery provider for the user's account (422). Next, the recovery provider 406 redirects the user agent running on the user device 404 back to the account provider 402 (424). For example, the user agent may be redirected to a callback URL that is included in the metadata information obtained from the account provider 402, along with a status code indicating whether the delegation operation was successful.

Figure 5:
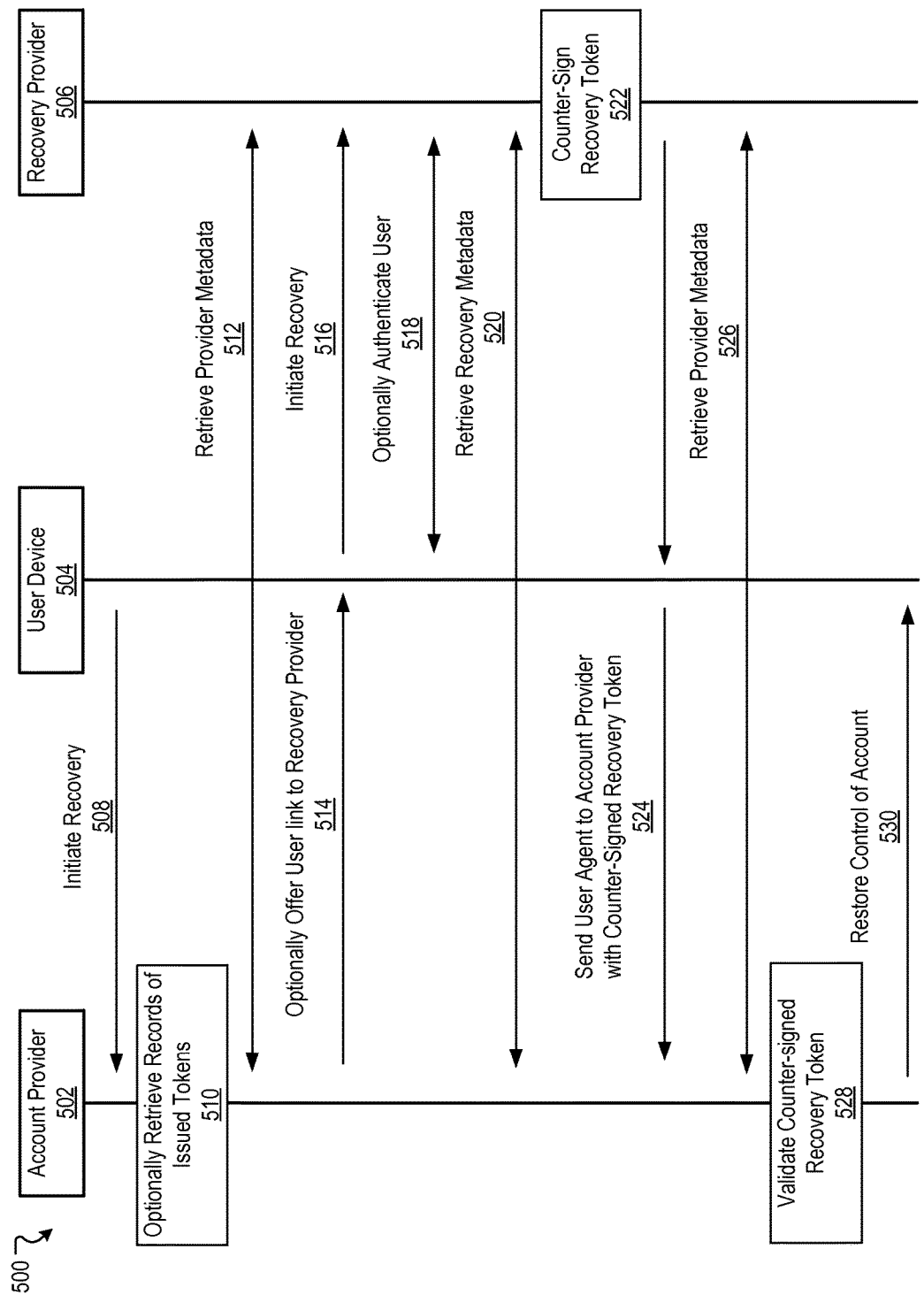
FIG. 5 illustrates an example diagram showing the access recovery of a delegated user account, according to an embodiment of the present disclosure.

FIG. 5 illustrates an example diagram 500 showing the access recovery of a delegated user account, according to an embodiment of the present disclosure. The example diagram 500 illustrates interactions between an account provider 502, a user device 504, and a recovery provider 506. It should be appreciated that there can be additional, fewer, or alternative steps performed in similar or alternative orders, or in parallel, within the scope of the various embodiments discussed herein unless otherwise stated.

In the example of FIG. 5, a user has a user account that is provided by the account provider 502. In this example, the user is operating the user device 504 to interact with the account provider 502 to initiate recovery of the user account (508). Such recovery may be needed, for example, because the user forgot the login credentials associated with the user account or such credentials no longer being valid due to the user's account being hacked. Upon initiating recovery, the account provider 502 can determine any recovery providers that have been authorized to recover the user's account and to which recovery tokens have previously been provided (510). In this example, the account provider 502 can determine that the recovery provider 506 was provided with such authorization and was previously sent a recovery token. The account provider 502 can obtain current metadata information associated with the recovery provider 506 (512). As mentioned, there may be more than one recovery provider that has been delegated with authorization to recover a user's account. In such instances, the account provider 502 can optionally provide the user device 504 with a listing of the potential recovery providers that can be utilized for the recovery process and the user can select the recovery provider to be used (514). In some embodiments, the user operating the user device 504 can indicate to the account provider 520 which recovery provider to use for the recovery. In some embodiments, the user can interact with the recovery provider 506 to initiate the recovery process (516). In such embodiments, the steps 508, 510, 512, and 514 are not performed.

Next, the recovery provider 506 authenticates the user operating the user device 504 (518). The recovery provider 506 can authenticate the user, for example, using a set of credentials associated with the user and the recovery provider 506. In some instances, if the user is already logged into the recovery provider 506, such authentication is not needed. The recovery provider 506 can obtain metadata information from the account provider 502 (520). For example, in some embodiments, the recovery provider 506 can perform a WebFinger request to the account provider 502 to obtain information for performing the user account recovery. Such information may include, for example, any recovery URLs (e.g., API endpoints) to be used for communicating with the account provider 502. The recovery provider 506 can obtain the recovery token associated with the user account being recovered, for example, from a data store, and can counter-sign the recovery token using a private key associated with the recovery provider 506 (522). Next, the recovery provider 506 can redirect the user agent (e.g., web browser or app) running on the user device 504 to the account provider 502 (524). For example, the user agent can be redirected to a recovery URL associated with the account provider 502 with the counter-signed recovery token. Once redirected, the account provider 502 can obtain the public key associated with the recovery provider 506, for example, using a WebFinger request (526). The account provider 502 can validate the counter-signed recovery token using the public key associated with the recovery provider (528). As part of the validation process, the account provider 502 can also validate any other information (e.g., token fields) counter-signed by the recovery provider 506 as well as the recovery token that was originally issued to the recovery provider 506. Once validation is complete, the account provider 502 can restore control of the user account to the user operating the user device 504 (530). Once restored, the account provider 502 can allow the user to create a new set of credentials to be associated with the user account or to designate a new primary authentication method, for example.

Figure 6:
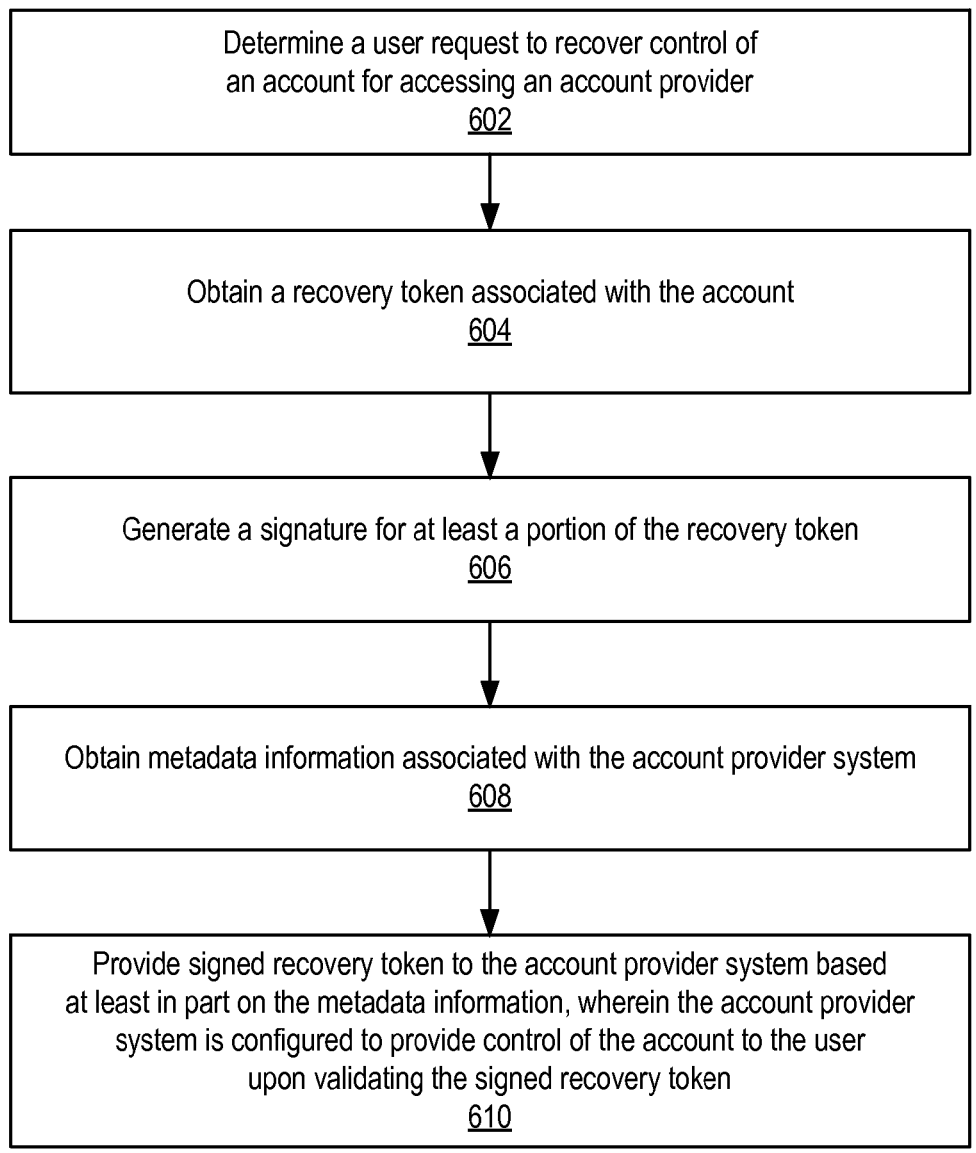
FIG. 6 illustrates an example method recovering user account access, according to an embodiment of the present disclosure.

FIG. 6 illustrates an example method 600 recovering user account access, according to an embodiment of the present disclosure. It should be appreciated that there can be additional, fewer, or alternative steps performed in similar or alternative orders, or in parallel, within the scope of the various embodiments discussed herein unless otherwise stated. At block 602, a determination is made of a user request to recover control of an account for accessing an account provider system. At block 604, a recovery token that is associated with the account can be obtained. At block 606, a signature for at least a portion of the recovery token can be generated. At block 608, metadata information associated with the account provider system can be obtained. At block 610, the signed recovery token can be provided to the account provider system based at least in part on the metadata information, wherein the account provider system is configured to provide control of the account to the user upon validating the signed recovery token.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
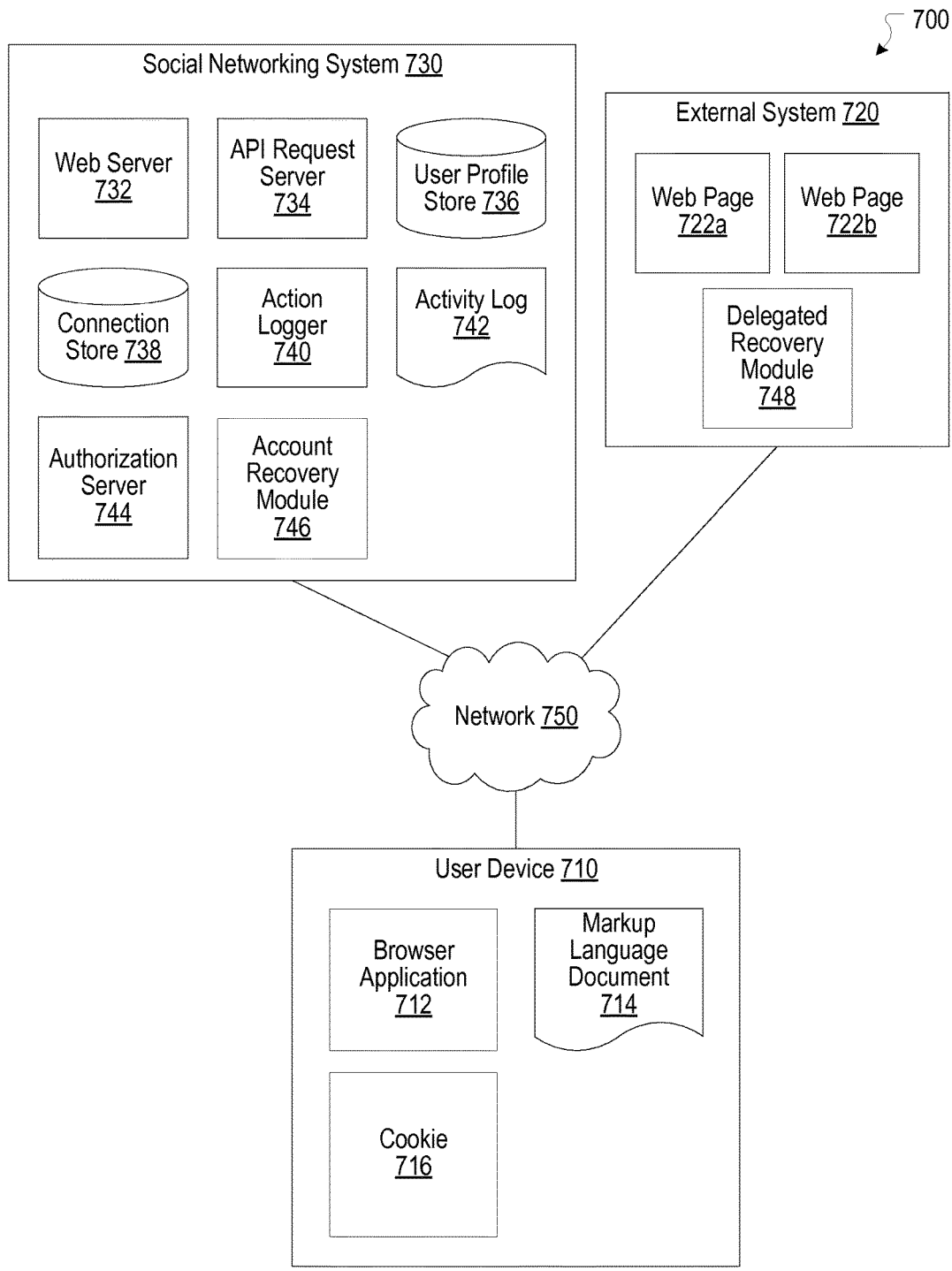
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. In some embodiments, the external system 720 can include an delegated recovery module 748. The delegated recovery module 748 can, for example, be implemented as the delegated recovery module 112 of FIG. 1. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an account recovery module 746. The account recovery module 746 can, for example, be implemented as the account recovery module 106 of FIG. 1. As discussed previously, it should be appreciated that there can be many variations or other possibilities.

Hardware Implementation

Figure 8:
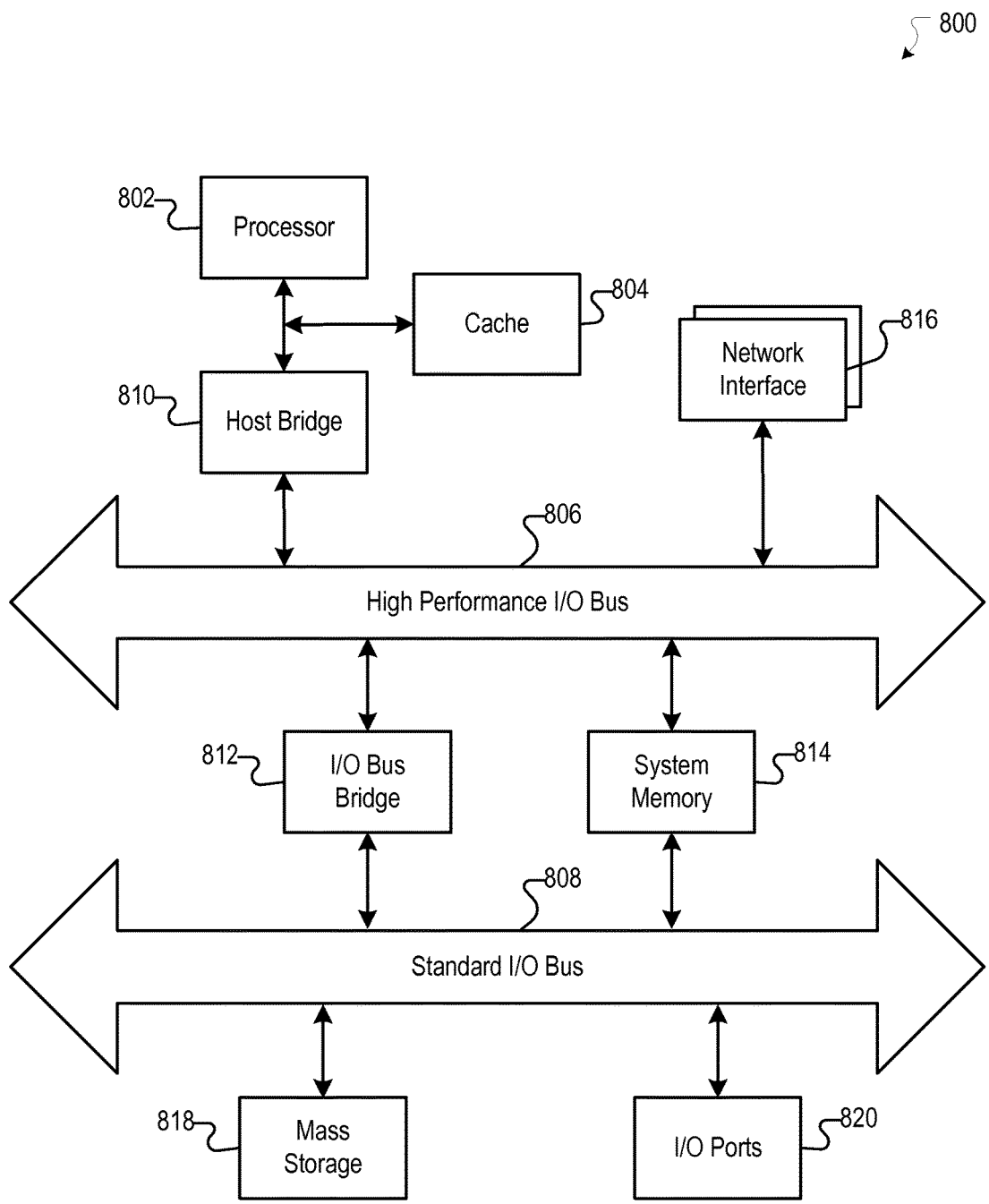
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a recovery provider system, a user request to recover control of an account for accessing an account provider system;
    obtaining, by the recovery provider system, metadata information associated with the account provider system, wherein the metadata information includes a communication protocol supported by the account provider system and a public key associated with the account provider system;
    determining, by the recovery provider system, whether the recovery provider system can facilitate the user request to recover control of the account based at least in part on the metadata information;
    obtaining, by the recovery provider system, a recovery token that is associated with the account, the recovery token having been generated by the account provider system;
    generating, by the recovery provider system, a signature for at least a portion of the recovery token, wherein the recovery token includes a first signed field indicating when the recovery provider system validated the recovery token, a second signed field indicating an internal user identifier corresponding to the user, and a third signed field indicating an identifier of the recovery provider system; and
    providing, by the recovery provider system, the signed recovery token to the account provider system based at least in part on the metadata information, wherein the account provider system is configured to provide control of the account to the user upon validating the signed recovery token and upon determining the internal user identifier matches an account identifier provided in the user request.

2. The computer-implemented method of claim 1, wherein determining the user request to recover control of the account further comprises:
    obtaining, by the recovery provider system, a set of credentials from the user, the set of credentials being associated with an account provided by the recovery provider system; and
    authenticating, by the recovery provider system, the user based at least in part on the set of credentials.

3. The computer-implemented method of claim 1, wherein the user request is initiated through the account provider system.

4. The computer-implemented method of claim 1, wherein the user request is initiated through the recovery provider system.

5. The computer-implemented method of claim 1, wherein the recovery token was previously provided to the recovery provider system by the account provider system.

6. The computer-implemented method of claim 1, wherein obtaining the recovery token that is associated with the account further comprises:
    validating, by the recovery provider system, the recovery token using the public key associated with the account provider system.

7. The computer-implemented method of claim 1, wherein providing the signed recovery token to the account provider system further comprises:
    redirecting, by the recovery provider system, a user agent running on a computing device of the user to the account provider system, wherein the user agent delivers the signed recovery token to the account provider system.

8. The computer-implemented method of claim 7, wherein the user agent is redirected to a Uniform Resource Locator (URL) included in the metadata information, wherein the account provider computing system is configured to receive the signed recovery token through the URL.

9. The computer-implemented method of claim 1, wherein the account provider system validates the signature using a public key obtained from the recovery provider system.

10. The computer-implemented method of claim 1, wherein, upon the signed recovery token being validated, the user creates a new set of credentials for the account.

11. A system comprising:
    at least one processor; and
    a memory storing instructions that, when executed by the at least one processor, cause the system to perform:
        determining a user request to recover control of an account for accessing an account provider system;
        obtaining metadata information associated with the account provider system, wherein the metadata information includes a communication protocol supported by the account provider system and a public key associated with the account provider system;
        determining whether the recovery provider system can facilitate the user request to recover control of the account based at least in part on the metadata information;
        obtaining a recovery token that is associated with the account, the recovery token having been generated by the account provider system;
        generating a signature for at least a portion of the recovery token, wherein the recovery token includes a first signed field indicating when the recovery provider system validated the recovery token, a second signed field indicating an internal user identifier corresponding to the user, and a third signed field indicating an identifier of the recovery provider system; and
        providing the signed recovery token to the account provider system based at least in part on the metadata information, wherein the account provider system is configured to provide control of the account to the user upon validating the signed recovery token and upon determining the internal user identifier matches an account identifier provided in the user request.

12. The system of claim 11, wherein determining the user request to recover control of the account further causes the system to perform:
    obtaining a set of credentials from the user, the set of credentials being associated with an account provided by the system; and
    authenticating the user based at least in part on the set of credentials.

13. The system of claim 11, wherein the user request is initiated through the account provider system.

14. The system of claim 11, wherein the user request is initiated through the system.

15. The system of claim 11, wherein the recovery token was previously provided to the system by the account provider system.

16. A non-transitory computer-readable storage medium including instructions that, when executed by at least one processor of a computing system, cause the computing system to perform a method comprising:
 determining a user request to recover control of an account for accessing an account provider system;
 obtaining metadata information associated with the account provider system, wherein the metadata information includes a communication protocol supported by the account provider system and a public key associated with the account provider system;
 determining whether the recovery provider system can facilitate the user request to recover control of the account based in part on the metadata information;
 obtaining a recovery token that is associated with the account, the recovery token having been generated by the account provider system;
 generating a signature for at least a portion of the recovery token, wherein the recovery token includes a first signed field indicating when the recovery provider system validated the recovery token, a second signed field indicating an internal user identifier corresponding to the user, and a third signed field indicating an identifier of the recovery provider system; and
 providing the signed recovery token to the account provider system based at least in part on the metadata information, wherein the account provider system is configured to provide control of the account to the user upon validating the signed recovery token and upon determining the internal user identifier matches an account identifier provided in the user request.

17. The non-transitory computer-readable storage medium of claim 16, wherein determining the user request to recover control of the account further causes the computing system to perform:
 obtaining a set of credentials from the user, the set of credentials being associated with an account provided by the system; and
 authenticating the user based at least in part on the set of credentials.

18. The non-transitory computer-readable storage medium of claim 16, wherein the user request is initiated through the account provider system.

19. The non-transitory computer-readable storage medium of claim 16, wherein the user request is initiated through the computing system.

20. The non-transitory computer-readable storage medium of claim 16, wherein the recovery token was previously provided to the computing system by the account provider system.

* * * * *